United States Patent
Tamhane et al.

(10) Patent No.: US 9,026,837 B2
(45) Date of Patent: May 5, 2015

(54) RESOURCE AWARE PLACEMENT OF APPLICATIONS IN CLUSTERS

(75) Inventors: Amitabh Prakash Tamhane, Redmond, WA (US); Mykyta Synytskyy, Bellevue, WA (US); Lokesh S Koppolu, Redmond, WA (US); David A. Dion, Bothell, WA (US); Andrea D'Amato, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 13/229,423

(22) Filed: Sep. 9, 2011

(65) Prior Publication Data

US 2013/0067267 A1 Mar. 14, 2013

(51) Int. Cl.
*G06F 11/07* (2006.01)
*G06F 15/16* (2006.01)
*G06F 11/14* (2006.01)
*G06F 11/34* (2006.01)

(52) U.S. Cl.
CPC .......... *G06F 15/161* (2013.01); *G06F 11/1482* (2013.01); *G06F 11/3433* (2013.01)

(58) Field of Classification Search
CPC  G06F 11/2025; G06F 11/203; G06F 11/2033
USPC .............................................. 714/4.11, 2, 6.3
See application file for complete search history.

(56) References Cited

U.S. PATENT DOCUMENTS

| | | | |
|---|---|---|---|
| 7,788,671 B2 | 8/2010 | Black-Ziegelbein et al. | |
| 2005/0160423 A1* | 7/2005 | Bantz et al. | 718/1 |
| 2005/0235064 A1* | 10/2005 | Barsness et al. | 709/229 |
| 2005/0251802 A1* | 11/2005 | Bozek et al. | 718/1 |
| 2006/0218243 A1* | 9/2006 | Kudo et al. | 709/218 |
| 2007/0234116 A1* | 10/2007 | Yoshikawa et al. | 714/13 |
| 2007/0294364 A1* | 12/2007 | Mohindra et al. | 709/217 |
| 2007/0294562 A1* | 12/2007 | Takamatsu et al. | 714/4 |
| 2008/0168424 A1* | 7/2008 | Mohindra et al. | 717/120 |
| 2008/0189418 A1 | 8/2008 | Kimbrel et al. | |
| 2009/0063699 A1* | 3/2009 | Chapweske et al. | 709/233 |
| 2009/0070623 A1* | 3/2009 | Sciacca | 714/4 |
| 2009/0119664 A1* | 5/2009 | Pike et al. | 718/1 |
| 2009/0328050 A1* | 12/2009 | Liu et al. | 718/104 |
| 2010/0058108 A1* | 3/2010 | Nammatsu et al. | 714/4 |
| 2010/0070377 A1* | 3/2010 | Williams et al. | 705/26 |
| 2010/0162259 A1* | 6/2010 | Koh et al. | 718/104 |
| 2010/0169490 A1 | 7/2010 | McNair | |
| 2010/0250746 A1* | 9/2010 | Murase | 709/226 |

(Continued)

OTHER PUBLICATIONS

Tian, et al., "Improving Application Placement for Cluster-Based Web Applications", In Proceedings of IEEE Transactions on Network and Service Management, vol. 8, Issue 2, Jun. 2011, pp. 104-115.

"Network Load Balancing Technical Overview", Retrieved on: Aug. 18, 2011, Available at: http://technet.microsoft.com/en-us/library/bb742455.aspx.

(Continued)

*Primary Examiner* — Chae Ko
(74) *Attorney, Agent, or Firm* — Kate Drakos; David Andrews; Micky Minhas

(57) ABSTRACT

Placing an application on a node in a cluster. A method includes detecting an unexpected event indicating that an application should be placed on a node in the cluster. Real time information about resource utilization on one or more nodes in the cluster is received. Based on the real time information, a determination of a node to place the application is made. The application is placed on the determined node.

20 Claims, 4 Drawing Sheets

(56) References Cited

U.S. PATENT DOCUMENTS

| | | | |
|---|---|---|---|
| 2011/0126207 A1* | 5/2011 | Wipfel et al. | 718/104 |
| 2011/0208839 A1* | 8/2011 | Oeda | 709/219 |
| 2011/0302312 A1* | 12/2011 | McCrory | 709/226 |
| 2012/0005344 A1* | 1/2012 | Kolin et al. | 709/226 |
| 2012/0096149 A1* | 4/2012 | Sunkara et al. | 709/224 |
| 2012/0137293 A1* | 5/2012 | Bozek et al. | 718/1 |
| 2012/0254433 A1* | 10/2012 | Gujral et al. | 709/226 |
| 2012/0297016 A1* | 11/2012 | Iyer et al. | 709/217 |
| 2013/0013774 A1* | 1/2013 | Ebrahim et al. | 709/224 |
| 2013/0060933 A1* | 3/2013 | Tung et al. | 709/224 |
| 2013/0073730 A1* | 3/2013 | Hansson et al. | 709/226 |

OTHER PUBLICATIONS

Hirt, et al., "Failover Clustering for Microsoft SQL Server 2005 and SQL Server 2005 Analysis Services", Retrieved on: Aug. 18, 2011, Available at: 2006 http://www.itatonce.com/Documents/PDF/SQLServer2005FOC.pdf, 2006.

Faik, et al., "A Model for Resource-aware Load Balancing on Heterogeneous Clusters", Published on: Jan. 15, 2005, Available at: http://j.teresco.org/research/publications/tpds05/tpds05.pdf.

Kichkaylo, et al., "Optimal Resource-Aware Deployment Planning for Component-based Distributed Applications", In Proceedings of the Thirteenth IEEE International Symposium on High Performance Distributed Computing, Jun. 4-6, 2004, pp. 150-159.

* cited by examiner

RESOURCE AWARE PLACEMENT OF APPLICATIONS IN CLUSTERS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computing systems could be interconnected to form a cluster with the computing systems acting as nodes in the cluster. For example, to ensure high availability of applications, it is common to host them in a distributed, multiple computer system (i.e. a cluster). Different techniques are used to ensure that the applications are distributed evenly across the different computers so that the resource utilization across them is balanced. For example, administrators of a cluster may be able to specify a preferred order of placement for each application.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method that may be practiced in a distributed computing environment including a cluster. The cluster includes a plurality of nodes. The method includes acts for placing an application on a node in the cluster. The method includes detecting an unexpected event indicating that an application should be placed on a node in the cluster. Real time information about resource utilization on one or more nodes in the cluster is received. Based on the real time information, a determination of a node to place the application is made. The application is placed on the determined node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein may be useful for placing applications in a cluster. For example, an event may occur that indicates a need to place an application in a cluster. For example, a node may fail or an application may fail requiring movement and/or restarting of applications. Embodiments may include functionality for receiving real time information about resource utilization on one or more nodes in the cluster. Using this real time information, embodiments can determine a node to place the application, after which the application can be placed on the determined node.

Figure 1:
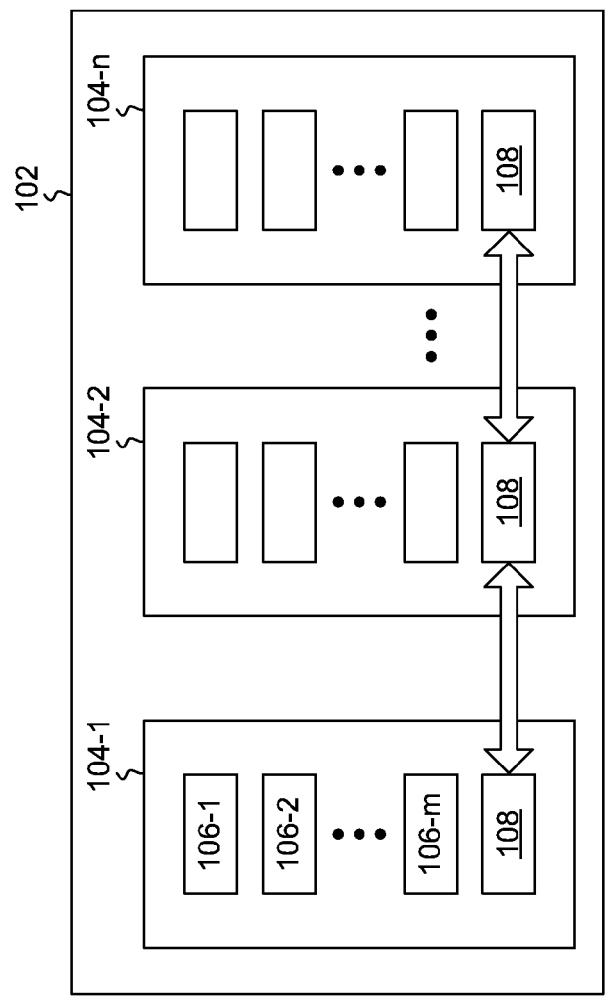
FIG. 1 illustrates a cluster and nodes in the cluster.

Referring now to FIG. 1, an example is illustrated. FIG. 1 illustrates a cluster 102. The cluster 102 includes a number of nodes referred to herein generically at 104, but illustrated specifically at 104-1, 104-2 through 104-n where the ellipses and variable "n" indicate a variable number of nodes. Each of the nodes 104 hosts one or more applications (referred to herein generically as 106). FIG. 1 illustrates specific examples of applications on node 104-1 as 106-1, 106-2 through 106-m where the ellipses and variable "m" indicate a variable number of applications. At least one or more of the nodes 104 includes an instance, or a portion of a clustering service 108. The clustering service 108 is responsible for adding new nodes 104 to the cluster 102 and for placing applications on nodes 104. While the clustering service is illustrated as being distributed across nodes 104 in the example illustrated in FIG. 1, it should be appreciated that in other embodiments, the clustering service 108 may be on fewer nodes 104, such as in one embodiment on a single node implemented as a director node.

Figure 2:
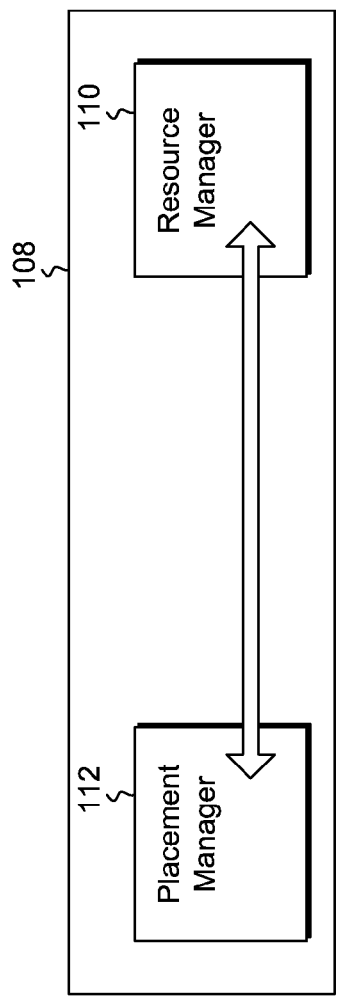
FIG. 2 illustrates interaction between a placement manager and a resource manager in a cluster.

Referring now to FIG. 2, additional details of one example embodiment of the clustering service 108 are illustrated. FIG. 2 illustrates a resource manager 110 coupled to a placement manager 112. The resource manager 110 may perform functions such as monitoring resources (processors, memory, network operations, storage operations, etc.) on various nodes 104 in the cluster, determining the amount of resources an application 106 to be deployed might need, etc. The placement manager 112 can interface directly with nodes 104 to place applications 106 on the nodes 104. Some embodiments disclosed herein allow application providers to extend a fixed set of resources by allowing other system resources or performance characteristics to be used.

Some embodiments implement an architecture for a plug-in based mechanism where applications that use resources of a certain type can define custom plug-ins that can be queried by the placement manager 112 to determine if an application 106 can be placed on a node 104. The plug-ins can determine the current utilization of resources, as defined in the plug-in, on a computer as well as optionally determine the utilization of that resource by an application 106 to be placed. Embodiments may use a custom comparator plug-in from an application provider to determine a preferred placement of an application. For example, in a cluster hosting database server application, the plug-in could monitor the average time taken for each database read/write operation on failure of an application. This might lead to the application 106 being placed on a computer where the current average time for these operations is lower than other machines on the cluster or within an acceptable threshold.

Some embodiments may alternatively or additionally allow an application provider to provide a list of performance counters or other diagnostics that can be used to determine application 106 placement. For example, a File Server application 106 can register the performance counter for IOPS (I/O Operations per second) with the placement manager 112 and specify a "less than" comparator to specify a threshold allowable for placing other instances of the File Server application. On failure, a file server application 106 will then be placed on a node 104 where the IOPS value is below the specified threshold. In another example, another type of application 106 could register its own custom performance counter, such as an available memory performance counter, and specify "greater than" as the comparator. This may cause an application, that has previously failed, to be placed on a node 104 where 'memory available for Hyper-v Guest Partition' is the highest.

When a failure occurs, (e.g., application 106 or node 104 crashes), it may be important to get the application 106 to start running again with the least amount of downtime on a node 104 where appropriate resources would be available for the application 106. A placement manager 112 that is distributed system-resource aware (e.g. aware of resources on the cluster 102 through the resource manager 110) enables an appropriate placement for the failed application 106, instead of placing it on a node 104 without determining an optimized placement in the first instance and then performing a rebalance of the application 106 later.

Many new server computers deployed today in data centers are NUMA (Non-Uniform Memory Access) aware machines which provide higher performance by attempting to allocate memory and virtual-processors on the same NUMA node. NUMA is a memory design used in multiprocessors. Each NUMA Node represents a collection of physical processors along with memory local to the processors. While a processor in one NUMA Node can access memory assigned to a different NUMA Node, there may be a performance hit to do so. Some embodiments enable appropriate placement of an application 106 upon failure using the NUMA aware memory and CPU utilization instead of selecting a node 104 for hosting the application 106 without considering the NUMA specific bindings. Examples of this will be illustrated in more detail below.

When a node 104 crashes and the applications running on it have to be placed on other nodes 104 and none of the other nodes 104 have enough resources for the nodes 104 to be placed on them, using real-time resource aware placement system, embodiments can determine an appropriate set of lower priority applications that could be stopped to be able to host a higher priority failed application 106 thereby reducing application 106 downtime for higher priority applications 106. Examples of this will be illustrated in more detail below.

Various embodiments may have various features that are discussed briefly here, but shown in more detail below. For example some embodiments may implement an architecture to enable applications to specify custom resources whose utilization across computers in the cluster should be balanced and a mechanism to determine the utilization of that resource per application 106 and the placement of applications 106 of that type in an appropriate way so that the resource's utilization is balanced.

Alternatively or additionally, embodiments may include functionality to identify, realtime upon failure of computer or an application 106 running on a node 104, a new host node 104 for that application. This could be done, for example, using runtime resource utilization information as well as static resource reservations so that the resource utilizations are optimally balanced across computers in the cluster. For example, the resource manager 110 illustrated in FIG. 2 could provide the placement manager 112 with real time resource utilization, which could be used to place applications 106 on nodes 104.

Some embodiments may alternatively or additionally include functionality to determine which node 104 a failed application 106 should be hosted on based on the NUMA specific memory and CPU requirements of the application 106 and the NUMA specific memory and CPU utilization across all computers in the cluster 102. For example, an application may require that all memory be in a single NUMA node using a single CPU. Information on a NUMA node basis could be provided to allow this requirement to be satisfied.

Embodiments may alternatively or additionally, upon failure of one or more nodes 104 in a multi-node system resulting in insufficient system resources to be able to host all applications, be able to determine which set (potentially a minimal set) of applications 106 of lower importance can be stopped to be able to run a higher priority application 106.

Referring once again to FIG. 2, in the illustrated embodiment, the Resource Manager 110 is responsible for collecting placement parameter information for various applications across different computers. Embodiments may additionally be implemented where resource manager 110 is also responsible for providing interface methods to the placement manager 112. Resource manager 110 may also implement various policies for placing the applications that provide custom placement parameters (e.g.: IOPS-I/O operations per second or NUMA Memory).

Figure 3:
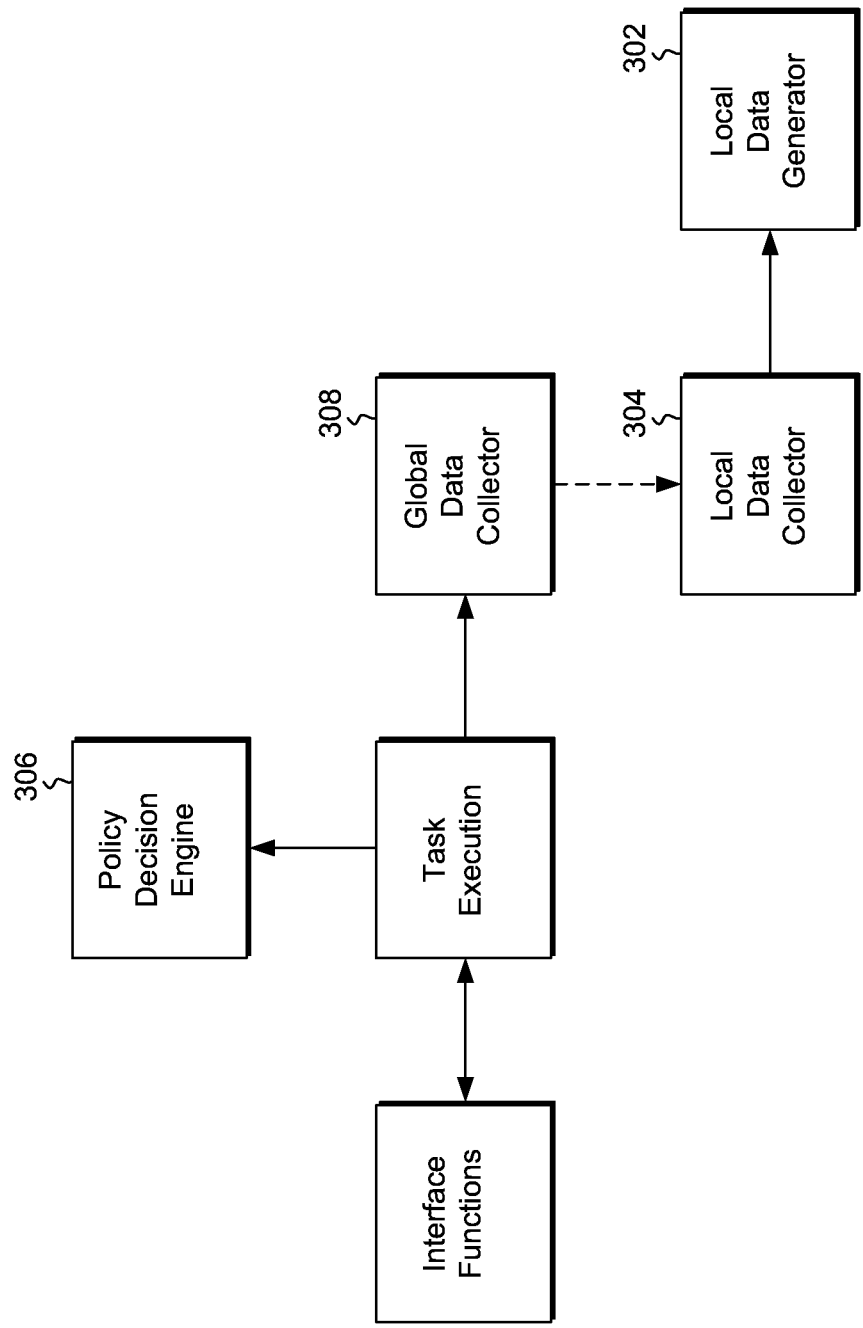
FIG. 3 illustrates various modules implemented in a cluster environment.

Referring now to FIG. 3, additional details are illustrated. FIG. 3 illustrates a local data generator 302 and local data collector 304. These modules 302 and 304 may be implemented on a node 104 and collect and provide resource information about a particular node 104. This information can be used by the policy decision engine 306 when determining application placement. The policy decision engine 306 may be included in the placement manager 112 (illustrated in FIG. 2). In particular, a global data collector 308 may collect data from a plurality of local data collectors 304 (one for each node 104 under consideration). Using all of the collected data, an appropriate node 104 can be selected to place an application 106. The policy decision engine 306 makes decisions for the optimized placements. The policy decision engine 306 may use optional pluggable policy modules associated with the applications for using resource utilization information for custom defined resources.

Participating applications that would like to be placed in a resource aware manner by the placement manager 112 may be implemented to support plug-in modules to provide the placement parameters (as described below) which are used for real-time optimized placement on failures.

Illustrating now additional details, embodiments may be configured to get local node 104 utilization information. In some embodiments, certain applications and/or application types may be configured to participate in resource aware application placement functionality. In some embodiments, participating application types may implement a plug-in, or otherwise include functionality, which returns resource usage information. For example, in some embodiments, a plug-in may return an identifier, an indication of available memory, and an indication of potential available memory after it has been reclaimed from other applications. The following illustrates an example in a NUMA system. An output buffer may contain an array of "NodeUtilizationInfoElement Structure" as follows:

```
struct NodeUtilizationInfoElement
{
    ULONGLONG Id;
    ULONGLONG AvailableMemory;
    ULONGLONG AvailableMemoryAfterReclamation;
};
```

Each of these structures maps to a corresponding Physical NUMA (PNUMA) of the Machine. A PNUMA is a physical organization of memory to its corresponding processor in a multiprocessor environment. In this structure, Id is the ID of the PNUMA it represents; AvailableMemory is memory that is available on the PNUMA at the time of a node query. AvailableMemoryAfterReclamation is memory that is available on the PNUMA including memory that can be potentially freed up from other applications. If no extra memory can be freed up, then AvailableMemoryAfterReclamation will be equal to AvailableMemory.

In some embodiments, participating application types may implement a plug-in, or otherwise include functionality, which returns application usage information. For example, in some one embodiment, an output buffer will contain an array of "ResourceUtilizationInfoElement Structure" as follows:

```
struct ResourceUtilizationInfoElement
{
    ULONGLONG PhysicalNumaId;
    ULONGLONG CurrentMemory;
};
```

In the particular illustrated example, each of these structures represents individual Virtual NUMAs (VNUMAs) of the resource. VNUMA is a virtual representation of a NUMA Node. A VNUMA Node represents collection of allocated subset of processors and associated memory. For most resources there will only be one VNUMA. For certain resources like "Virtual Machine" there may be more than one VNUMA. In this example, PhysicalNumaId maps to the ID of the PNUMA where the memory is allocated. CurrentMemory represents the memory allocated to the VNUMA.

The accuracy of application placement algorithms depends upon the accuracy of application 106 and node 104 utilization information. In some embodiments, resource manager 110 collects this global placement information to make appropriate decisions. Thus, the correctness of resource manager's 110' placement decisions depends upon the accuracy of the information collected locally by all nodes 104.

Node utilization Information, in some embodiments, is collected by calling custom plug-ins for a specific application type. To have accurate and up to date information, node utilization information, in some embodiments, is updated at: (1) on node join event—resource manager 110 queries the newly joined node 104 to collect the node utilization information; (2) every time an resource manager 110 interface method for placement is called, resource manager 110 collects global node utilization information; (3) on node evict event, resource manager 110 resets the node-specific information effectively disabling placement on this node.

In some embodiments, resource utilization information is collected by calling the plug-ins supported by the applications as well as the known resource types supported by the cluster host service. To have accurate and up to date information, resource utilization information is collected at: (1) on application created event—resource manager 110 reads the start requirements for the application; (2) on application deleted event—resource manager 110 resets the information for the resource; (3) on application pre-online event—resource manager 110 updates the current utilization information according to start requirements; (4) on application post-online event—resource manager 110 gets the actual utilization information; (5) on application post-offline or failed event—resource manager 110 resets the current utilization for the application; (6) applications start requirements are read directly from user predefined configuration (if resource is offline) and also cached whenever required; (7) local node crawler: to take care of resource utilization changes when application 106 is online. There is a local node crawler which calls the application plug-in to get their most current utilization information. The time period after which the local node crawler reruns may be hard-coded according to the expected time-frame after which resource utilization may have changed.

resource manager 110 also, if needed, uses the resource start information as an approximation when resource current utilization information is not available.

Figure 4:
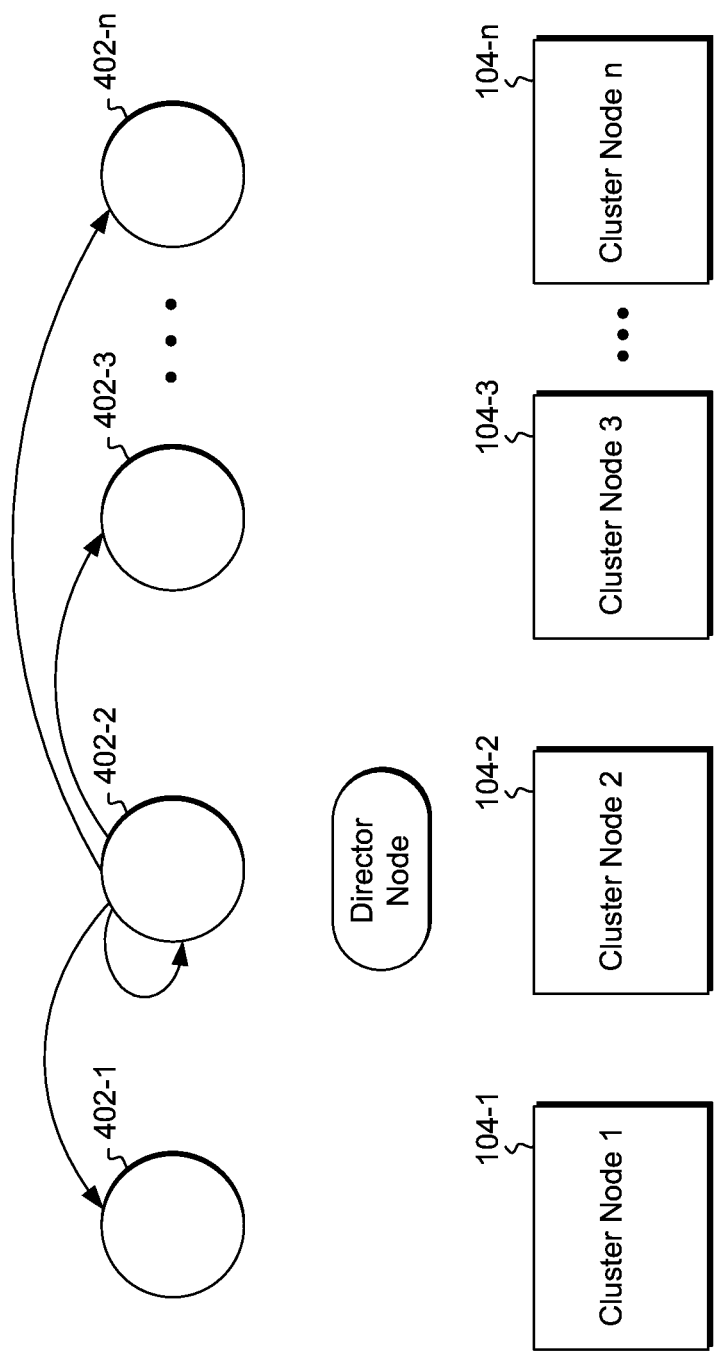
FIG. 4 illustrates various nodes in a cluster.

As mentioned previously, the utilization information is collected locally by individual nodes 104. As illustrated in FIG. 4, the resource manager 402-2 on a director node 104-2, which is a centralized node that may be selected or elected to perform coordinating activities between the different nodes, collects the utilization information for both applications and nodes 104 at the time when public interface methods are called on resource manager. To collect global collection information, resource manager sends messages to other nodes 104-1, 104-3 and 104-*n,* which are handled by resource managers 402-1, 402-3, and 402-*n* on the corresponding nodes 104-1, 104-3, and 104-*n* and it replies with appropriate payload information.

Some embodiments may implement a full global fetch. This is a type of message whose payload contains all the utilization information available on a node. This includes the node utilization information as well as utilization information for all the applications hosted on that node.

Alternatively or additionally, embodiments may implement an optimized global fetch. This is a type of message whose payload contains the utilization information only for a node. The payload does not contain any information about applications.

The following illustrates detailed placement algorithm information. The interface methods described above are the primary external functionality provided by the resource manager 110. Embodiments are illustrated which show how other modules, that need this functionality, interface with resource manager 110. Embodiments are also illustrated with show the details of the logic behind resource manager 110.

Embodiments may include functionality for identifying start requirements for a target application. The start requirements, in some embodiments, are identified by computing the start requirements of all applications. In some embodiments, each application 106 writes its start requirements to a known location. For example, in Windows Server environments available from Microsoft Corporation of Redmond Washington, start requirements may be written in a cluster database under the application's private properties key. The cluster database resides in the Windows Server family registry on each cluster node. It contains information about all physical and logical elements in a cluster, including cluster objects, their properties, and configuration data.

Based on the above information, each application's start requirements is calculated as a list of VNUMAs each with a memory requirement of (CLUSREG_NAME_START_MEMORY/CLUSREG_NAME_VIRTUAL_NUMA_COUNT). After finding the list of VNUMAs per resource, the application's VNUMA requirement may be a simple list of VNUMAs each with its own memory requirements.

Embodiments may include functionality for verifying a node 104 for hosting a target application. Each node's available memory per PNUMA information may be present at the director node 104 by global fetch logic. Based on the node's available memory information and application's start requirements embodiments can determine whether or not the application 106 can successfully start on this node. The following illustrates one algorithm that can be used to make such a determination:
1. Calculate target applications start requirements
   If target application's start requirements are not present, then STOP.
2. Sort node's PNUMAs and/or VNUMAs according to the available memory in descending order. PNUMA with max available memory in the front and so on.
3. Loop:
   For each target application's VNUMA (sorted in descending order):
   For each node's PNUMA (sorted):
   If (VNUMA<=PNUMA) then PNUMA::AvailableMemory–VNUMA;
   Else application cannot be placed on this node.
   If target application's all VNUMA fit on this node, then the application 106 can start on this node.
   Otherwise target application 106 cannot start on this node.

In some situations, no node 104 may have enough resources to directly place an application. However, embodiments can nonetheless select a list of nodes 104 for placing a target application 106 even when no node 104 has enough resources. In some embodiments, an application resource utilization placement ranker could call a method on the resource manager 110 to get sorted nodes 104 on which the target application 106 can be placed. The method may implement an algorithm such as the following algorithm:
1. Calculate target application's start requirements.
   If target application's start requirements are not present, then STOP. Return appropriate error.
2. Perform optimized global fetch and aggregate all nodes 104 available memory data.
3. From the input node list, remove the nodes 104 that cannot host this application.
4. Sort the remaining nodes 104 from the original input node list by max PNUMA available memory.
5. The output node list would be a sorted node list according to max PNUMA available memory.

In some embodiments, applications on a node 104 may need to be stopped to make room for a target application 106 to be placed. In some embodiments, it may be desirable to stop the least number of applications (sometimes referred to herein as preemptees or preempted applications). Thus, some embodiments may include functionality for identifying equivalent applications for a target application. For a specified target application, embodiments may attempt to find list of applications whose memory consumption is equivalent to the start requirements of the target application. The following illustrated an algorithm to perform this functionality:
1. Calculate target application's start requirements.
   If target application's start requirements are not present, then STOP. Return ERROR_NOT_FOUND.
2. If required perform full global fetch and aggregate all nodes 104 available memory data as well as all preemptable application's current utilization data.
3. Generate PNUMA mapping for the given potential preemptees (input applications).
   This is a list of PNUMA with each PNUMA itself having a list of VNUMAs mapped to it.
   There is a separate map of each VNUMA to the corresponding application.
4. Sort the list of PNUMA according to the available memory before preempting any potential preemptee application.
5. Loop:
   For each VNUMA of the target application:
   Select all the VNUMAs on the first PNUMA that need to be preempted to satisfy the VNUMA of the target application.
   Map each VNUMA marked for preemption to the corresponding application(s).
   Identify other VNUMAs of the application 106 to be marked for preemption.
   For all the VNUMAs marked for preemption increment the available memory of the PNUMA(s).
   Subtract the PNUMA memory by the VNUMA of the target application.
   Sort the PNUMA according to the available memory.
6. If even after stopping all the potential preemptees, all the VNUMAs of the target application 106 are not satisfied then return error indicating that there are not enough resources for that application. But, the output list of applications would contain all the input potential preemptees. Thus, preemption manager would still preempt all the applications and attempt to start the target application.

This algorithm specifically prefers fewer preemptions over freeing more memory for a specific PNUMA.

Embodiments may include functionality for selecting a list of nodes 104 for placing a target application 106 with preemptions. Embodiments may attempt to find a list of possible nodes 104, in preference order, which can host the target application 106 after preempting a sufficient number of preemptable applications. The following illustrates an algorithm for performing such functionality:
1. Calculate target application's start requirements.
   If target application's start requirements are not present, then STOP. Return appropriate error.
2. Perform full global fetch and aggregate all nodes 104 available memory data as well as all preemptable resources current utilization data.

3. For each node in the input node list, identify list of applications that can be preempted by the target application.
4. For each node 104 in the input node list, update the available memory for each of the PNUMAs after considering the preemption target application.
5. From the modified Input node list, remove the nodes 104 that cannot host this application.
6. Sort the remaining nodes 104 from the original input node list by max PNUMA available memory or sort by minimum number of applications that need to be preempted.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
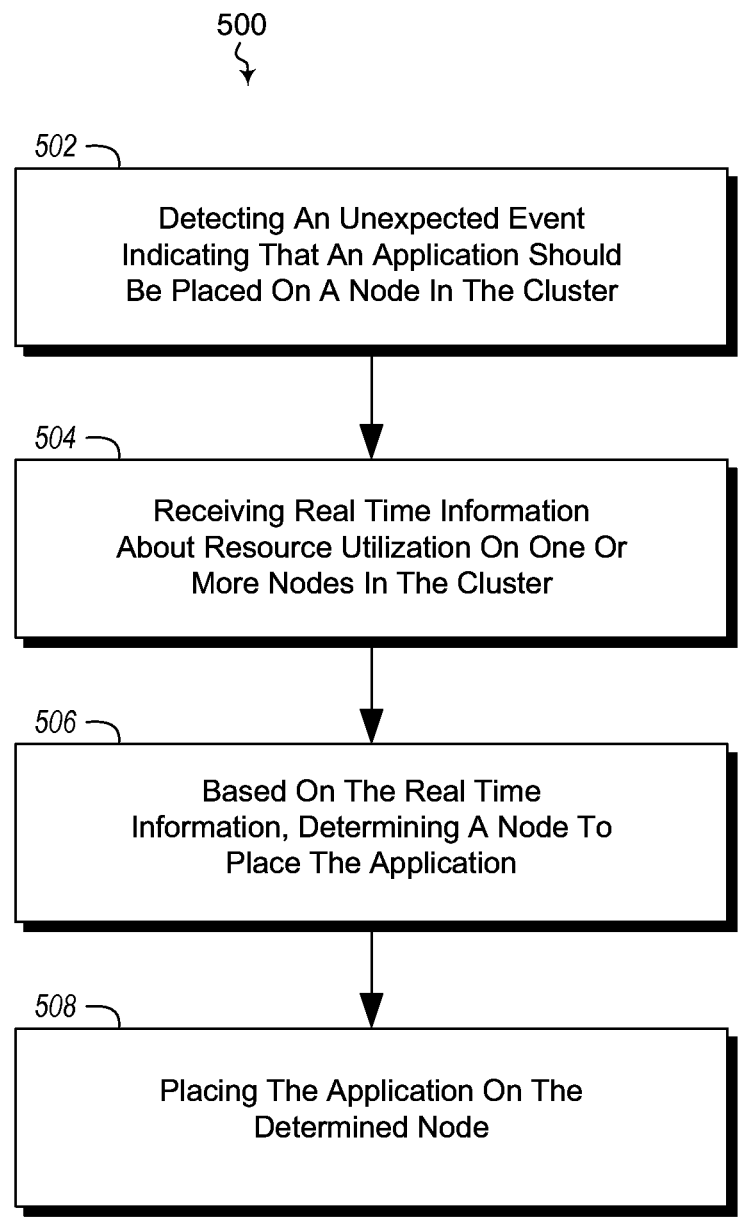
FIG. 5 illustrates a method of placing an application in a cluster.

Referring now to FIG. 5, a method 500 is illustrated. The method 500 may be practiced in a distributed computing environment including a cluster (such as cluster 102). The cluster includes a plurality of nodes (such as nodes 104). The method includes acts for placing an application (such as applications 106) on a node in the cluster. The method includes detecting an unexpected event indicating that an application should be placed on a node in the cluster (act 502). The unexpected event may be unexpected from the perspective of one entity, though not unexpected from the perspective of every entity. For example, failure of node may be unexpected from the perspective of the cluster or a node, but is not unexpected from the perspective of a user who physically removes power from a computing system hosting the node.

The method 500 further includes receiving real time information about resource utilization on one or more nodes in the cluster (act 504). For example, real time information may be received about the amount memory available, the amount of memory that can be freed up if applications on the node are shut down, the amount of network usage at the node, the amount of storage operations at the node, the amount of processor usage at the node, etc.

The method 500 further includes, based on the real time information, determining a node to place the application (act 506).

The method 500 further includes, placing the application on the determined node (act 508).

The method 500 may be practiced where receiving real time information, comprises receiving information from a configurable plug-in. For example, the plug-in may be configured by one or more of an application author, a user, another application, etc. The plug-in can be programmed to obtain customized information. For example, the plug-in may be configured to obtain real time information for a particular resource (such as one or more of processor usage, memory usage, network usage, or I/O usage) as configured in the plug-in. The plug-in can be configured to determine what resources and how much of those resources other applications on a node are using. The plug-in can be configured, for example, by an application author, user, another application, etc. The plug-in can be configured to obtain various types of information. For example, a plug-in may be able to obtain from an application information about what resources, and how much of those resources are needed to place an application. Alternatively or additionally, a plug-in may be configured to determine how much of a given resource is being used by a node. Such information can be obtained on a node basis as a total. Alternatively or additionally, such information may be obtained on an application basis to determine how much of a given resource is being used by a particular application on a node. As noted, such resource requirement or usage information may include information related to resources such as memory, CPU, network, and/or storage (e.g. disk).

The method 500 may be practiced where determining a node to place the application is performed by a configurable plug-in.

The method 500 may be practiced where determining a node to place the application is performed by determining an amount of resources needed by an application and determining at least one of an amount of resources available at the node or potentially available at the node. For example, a determination may be made to determine thresholds how much of one or more resources are needed to place an application. A node, in its present state may have the amount of resources needed available. Alternatively, a node may not presently have the amount of resources needed, but may potentially have the amount of resources needed. For example, it may have an appropriate amount of resources to place an application if other applications running on the node are shut down. Thus, information can be obtained about a node's potential resources, which can be used to select a node for placing an application.

The method 500 may be practiced where determining a node to place the application 106 is performed based one or more prioritizations. For example, embodiments may determine that an application to be placed has a higher priority than one or more applications already running on one or more nodes in the cluster. An application may be placed on a node by shutting down other applications of lower priority to make room for the application on the node. Thus, some applications may be prioritized above other applications. Alternatively or additionally, prioritizations may be based on nodes. For example, some nodes may be preferred over other nodes. Thus, attempts may be made to place applications on more preferred nodes before attempting to place them on less preferred nodes. Similarly, an application may be placed on a node by ignoring resources reserved by lower priority applications on that node.

The method 500 may be practiced where the unexpected event comprises one or more of a node failure, an application failure, or a user command.

The method 500 may be practiced where nodes in the cluster periodically collect resource information, and wherein receiving real time information about resources comprises receiving the periodically collected information from the nodes. For example nodes may be configured to collect resource usage information periodically at the node itself This information from the nodes could be sent to a placement manager where it could be used to determine how an application will be placed. In some embodiments, the placement manager may collect the information by a request for specific information. In these embodiments, all of the collected information is not sent, but rather only the information requested. For example, the placement manager may only request information for certain sources while ignoring others. For example, memory may be an important resource while network accesses may be less important. Thus, the placement manager may request and collect information related to memory resources, but not network resources.

The method 500 may be practiced where nodes in the cluster collect resource information on one or more events. Thus, rather than a periodic or scheduled collection, a node may collect resource information on events. Such events may be, for example but not limited to, node shut down, application start, an operating system event, significant changes in resource utilization counters maintained by the operating system, etc. As in other embodiments, the resource information could be held locally, but later provided when requested.

The method 500 may be practiced where receiving real time information is performed based on a query of one or more nodes in the cluster. For example, a placement manager may query nodes and receive resource information from the nodes. In some embodiments, the query may be from a customized plug-in configured to make such queries. In some embodiments, the query may be an optimized query. For example, and optimized query may only ask about resources in a way that is customized for a particular application.

The method 500 may be practiced where receiving real time information comprises receiving processor and memory configuration and/or utilization for a NUMA system. In some such embodiments, placement is based on this information and application requirements with respect NUMA systems. For example, some applications may not allow for memory to be split across NUMA nodes. Embodiments can ensure that resources are sufficient on a NUMA node basis, if required.

The method 500 may be practiced where determining a node to place the application determines a node with applications that could be displaced to place the application. For example, a node may not immediately have sufficient resources to place an application, but by stopping one or more applications, it may be possible to place the application. Stopping applications may be optimized in a number of different ways. For example, applications may be stopped such that the least number of applications are stopped to make room for a new application. This could be done by stopping one or more applications whose combined memory usage most nearly match the required memory usage of a new application. Alternatively or additionally, applications may be stopped based on importance. For example lower priority or less important applications may be stopped before higher importance applications. Further, a new application may need to have a particular threshold of importance for other applications to be stopped to make room for the new application.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment comprising a cluster, the cluster comprising a plurality of nodes, a method of placing an application on a node in the cluster, the method comprising;

detecting an event indicating that an application should be placed on a node in the cluster;

receiving real time information about resource utilization on one or more nodes in the cluster, the real time information including an indication of at least one specified type of resource that is to be used by the application, an amount of the specified type of resource that is to be provided for the application, and further indicating one or more potentially available resources that would be available upon stopping one or more applications and reclaiming those resources;

based on the real time information, determining a node on which to place the application, the node having at least the specified amount of the specified types of resources available for use by the application and at least a portion of potentially available resources that would be available upon stopping one or more applications and reclaiming those resources; and placing the application on the determined node.

2. The method of claim 1, wherein receiving real time information, comprises receiving information from a configurable plug-in.

3. The method of claim 1 wherein determining a node to place the application is performed by a configurable plug-in.

4. The method of claim 1 wherein determining a node to place the application is performed by determining an amount of resources needed by an application and determining at least one of an amount of resources available at the node or potentially available at the node.

5. The method of claim 1 wherein determining a node to place the application is performed based one or more prioritizations.

6. The method of claim 1, wherein the unexpected event comprises one or more of a node failure, an application failure, or a user command.

7. The method of claim 1, wherein nodes in the cluster periodically collect resource information, and wherein receiving real time information about resources comprises receiving the periodically collected information from the nodes.

8. The method of claim 1, wherein nodes in the cluster collect resource information on one or more events.

9. The method of claim 1, wherein receiving real time information is performed based on a query of one or more nodes in the cluster.

10. The method of claim 1, wherein receiving real time information comprises receiving processor and memory configuration and/or utilization for a NUMA system, and wherein placement is based on this information and application requirements with respect NUMA systems.

11. The method of claim 1, wherein determining a node to place the application determines a node with applications that could be displaced to place the application.

12. A computer readable storage medium comprising computer executable instructions that when executed by one or more processors causes the following to be performed:

detecting at least one of an application failure or a node failure;

as a result of the application failure or node failure, determining that an application should be placed on a node in the cluster;

receiving real time information about resource utilization on one or more nodes in the cluster, the real time information including an indication of at least one specified type of resource that is to be used by the application, an amount of the specified type of resource that is to be provided for the application, and further indicating one or more potentially available resources that would be available upon stopping one or more applications and reclaiming those resources;

based on the real time information, determining a node on which to place the application, the node having at least the specified amount of the specified types of resources available for use by the application and at least a portion of potentially available resources that would be available upon stopping one or more applications and reclaiming those resources; and attempting to place the application on the determined node.

13. The computer readable medium of claim 12, wherein receiving real time information, comprises receiving information from a configurable plug-in.

14. The computer readable medium of claim 12, wherein determining a node to place the application is performed by a configurable plug-in.

15. The computer readable medium of claim 12, wherein determining a node to place the application is performed by determining an amount of resources needed by an application and determining at least one of an amount of resources available at the node or potentially available at the node.

16. The computer readable medium of claim 12, wherein nodes in the cluster periodically collect resource information, and wherein receiving real time information about resources comprises receiving the periodically collected information from the nodes.

17. The computer readable medium of claim 12, wherein receiving real time information is performed based on a query of one or more nodes in the cluster.

18. The computer readable medium of claim 12, wherein receiving real time information comprises receiving processor and memory configuration and/or utilization for a NUMA system, and wherein placement is based on this information and application requirements with respect NUMA systems.

19. The computer readable medium of claim 12, wherein determining a node to place the application determines a node with applications that could be displaced to place the application.

20. A distributed computing system, the computing system comprising:

a plurality of computers wherein the computer are organized into a computing cluster;

a resource manager, wherein the resource manager is configured to receive real time information about resource utilization on one or more nodes in the cluster, the real time information including an indication of at least one specified type of resource that is to be used by the application, an amount of the specified type of resource that is to be provided for the application, and further indicating one or more potentially available resources that would be available upon stopping one or more applications and reclaiming those resources;

a placement manager, wherein the placement manager is configured to:

detect an event indicating that an application should be placed on a node in the cluster;

based on the real time information, determine a node on which to place the application, the node having at least the specified amount of the specified types of resources available for use by the application and at least a portion of potentially available resources that would be available upon stopping one or more applications and reclaiming those resources; and place the application on the determined node.

* * * * *